US006978857B2

(12) United States Patent
Korenjak

(10) Patent No.: US 6,978,857 B2
(45) Date of Patent: Dec. 27, 2005

(54) PARKING GEAR ASSEMBLY FOR AN ALL TERRAIN VEHICLE

(75) Inventor: Norbert Korenjak, Stadl Paura (AT)

(73) Assignee: Bombardier Recreational Products Inc., Verdun (CA)

( * ) Notice: Subject to any disclaimer, the term of this patent is extended or adjusted under 35 U.S.C. 154(b) by 65 days.

(21) Appl. No.: 10/449,615

(22) Filed: Jun. 2, 2003

(65) Prior Publication Data

US 2003/0221893 A1 Dec. 4, 2003

Related U.S. Application Data

(60) Provisional application No. 60/384,174, filed on May 31, 2002.

(51) Int. Cl.[7] ............................................. B60K 1/00
(52) U.S. Cl. ...................... 180/292; 180/366; 180/370; 182/219.5
(58) Field of Search ............................... 180/292, 343, 180/364, 366, 370, 282; 192/219.4, 219.5

(56) References Cited

U.S. PATENT DOCUMENTS

| | | | | |
|---|---|---|---|---|
| 3,703,941 A | * | 11/1972 | Ohie et al. ..................... 188/31 |
| 4,177,886 A | * | 12/1979 | Hiraiwa et al. .......... 192/219.5 |
| 4,487,302 A | * | 12/1984 | Morimoto et al. ....... 192/219.5 |
| 4,493,403 A | * | 1/1985 | Takano et al. ........... 192/219.5 |
| 4,671,133 A | * | 6/1987 | Yamada ....................... 74/530 |
| 4,699,234 A | * | 10/1987 | Shinozaki et al. .......... 180/233 |
| 4,704,920 A | * | 11/1987 | Kurata ................... 74/665 GC |
| 5,170,869 A | * | 12/1992 | Svab et al. ............... 192/219.5 |
| 5,794,748 A | * | 8/1998 | Heuver et al. ........... 192/220.2 |
| 6,065,581 A | * | 5/2000 | Nogle ..................... 192/219.5 |
| 6,164,427 A | * | 12/2000 | Ogawa .................... 192/219.5 |
| 6,279,713 B1 | * | 8/2001 | Young et al. ............ 192/219.5 |
| 6,296,073 B1 | | 10/2001 | Rioux et al. |
| 6,536,576 B2 | * | 3/2003 | Ono ......................... 192/219.5 |
| 6,691,815 B2 | * | 2/2004 | Rioux et al. ................ 180/292 |
| 6,725,962 B1 | * | 4/2004 | Fukuda ....................... 180/292 |
| 6,896,087 B2 | * | 5/2005 | Korenjak et al. .......... 180/292 |

* cited by examiner

Primary Examiner—Paul N. Dickson
Assistant Examiner—Toan C. To
(74) Attorney, Agent, or Firm—BRP Legal Services

(57) ABSTRACT

A straddle-type vehicle includes a frame supporting front and rear wheels, a seat supported above the frame, and an engine having an output shaft. The engine is supported by the frame below the seat. A transmission is coupled to the output shaft. The transmission includes gears. A shift assembly is operatively connected to the engine and is displaceable over a predetermined distance upon application of a predetermined amount of force by a vehicle operator. The selective displacement of the shift assembly shifts the gears. A parking gear assembly is selectively displaceable along with the shift assembly to selectively engage one of the gears to prevent movement of the output shaft.

9 Claims, 13 Drawing Sheets

PARKING GEAR ASSEMBLY FOR AN ALL TERRAIN VEHICLE

The present application claims priority to U.S. Provisional Application Ser. No. 60/384,174, which was filed on May 31, 2002, the entirety of which is hereby incorporated into the present application by reference.

BACKGROUND OF THE INVENTION

1. Field of the Invention

The present invention relates to a parking gear assembly for locking an all terrain vehicle (ATV) in a park position.

2. Description of Related Art

Typically, an ATV includes front wheels and rear wheels suspended on a front end and on a rear end, respectively, of a body frame. Handlebars and a seat are mounted on the frame. A power unit such as an engine is also mounted on the frame and generates the power required to propel the ATV. A transmission is provided to transfer the power generated by the engine to the front wheels, the rear wheels or both the front and rear wheels to drive the ATV. Typically, the ATV operator moves the transmission to a neutral or geared position when the ATV is not in use. This can be dangerous as the ATV may move if parked on a hill, for example. There is no structure to prevent the output shaft of the engine from rotating. Accordingly, there exists a need to provide an ATV with a parking gear assembly to prevent movement of the output shaft of the engine and hence movement of the ATV when stopped.

Bombardier's TRAXTER® ATV includes a parking gear that is mounted on the output shaft. See U.S. Pat. No. 6,296,073, incorporated herein by reference. A need has developed in the art to provide a parking gear that is less expensive, yet just as reliable as the parking gear for the TRAXTER®.

SUMMARY OF THE INVENTION

It is one aspect of the present invention to provide a parking gear assembly for an ATV. According to one preferred embodiment of the present invention, a straddle-type vehicle includes a frame supporting front and rear wheels, a seat supported above the frame, and an engine having an output shaft. The engine is supported by the frame below the seat. A transmission is coupled to the output shaft. The transmission includes gears. A shift assembly is operatively connected to the engine and is displaceable over a predetermined distance upon application of a predetermined amount of force by a vehicle operator. The selective displacement of the shift assembly shifts the gears. A parking gear assembly is selectively displaceable along with the shift assembly to selectively engage one of the gears to prevent movement of the output shaft.

Other aspects, features and advantages of this invention will become apparent from the following detail description when taken in conjunction with the accompanying drawings, which are a part of this disclosure, and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED PREFERRED EMBODIMENTS

Figure 1:
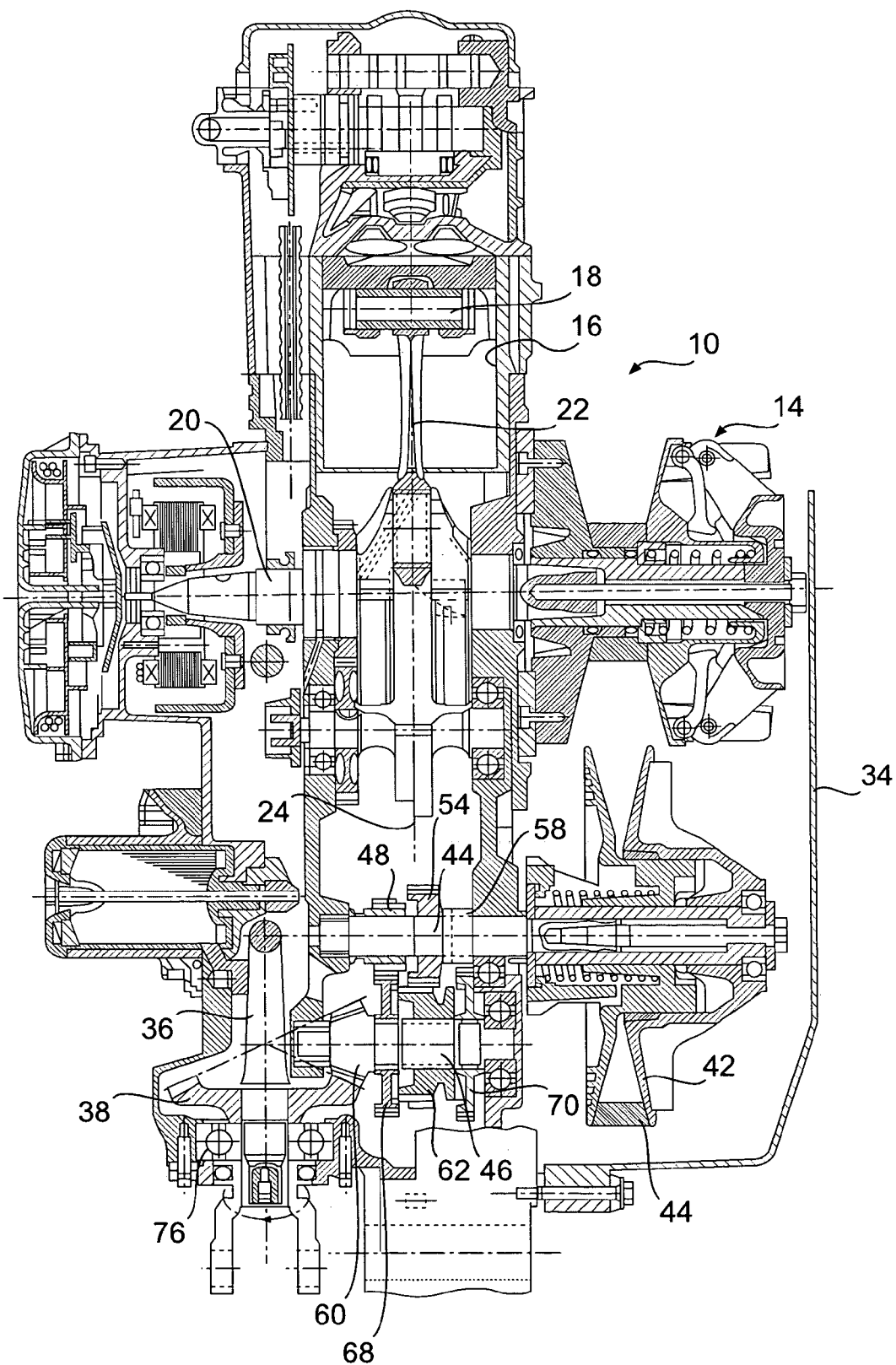
FIG. 1 is a cross-sectional view of an engine taken perpendicularly to the longitudinal center line of the engine (the center line being defined as the line running through the center of the single cylinder of the engine)

FIG. 1 illustrates an engine 10 equipped with a parking gear assembly, generally indicated at 12 in FIGS. 3, 4, and 9–11 of the present invention. In the illustrated embodiment, the engine 10 is a single cylinder, internal combustion engine with an associated continuously variable transmission (CVT) 14. However, the engine 10 should not be limited to such CVT engine. Instead, the features of the present invention may be applied to any type of internal combustion engine, as would be appreciated by those skilled in the art. For example, the features of the present invention may be applied to a multiple cylinder, in-line, V-type, or opposed cylinder engine without deviating from the scope of the present invention.

Furthermore, while the present invention includes a CVT for use with a single cylinder engine, those skilled in the art would readily appreciate that the CVT could be easily used with any other type, style, or size of internal combustion engine. Moreover, while a CVT is preferred for use with the engine of the present invention, it would be readily appreciated by those skilled in the art that the standard gear shift could be substituted for the CVT without deviating from the scope of the present invention.

In addition, while the engine 10, CVT 14, and parking gear assembly 12 have been specifically designed for use with an ATV, which is the preferred use for the present invention, the present invention is not limited just to use on ATVs. To the contrary, the present invention may be used in any vehicle type, including cars, scooters, motorcycles, and other suitable vehicles.

Figure 3:
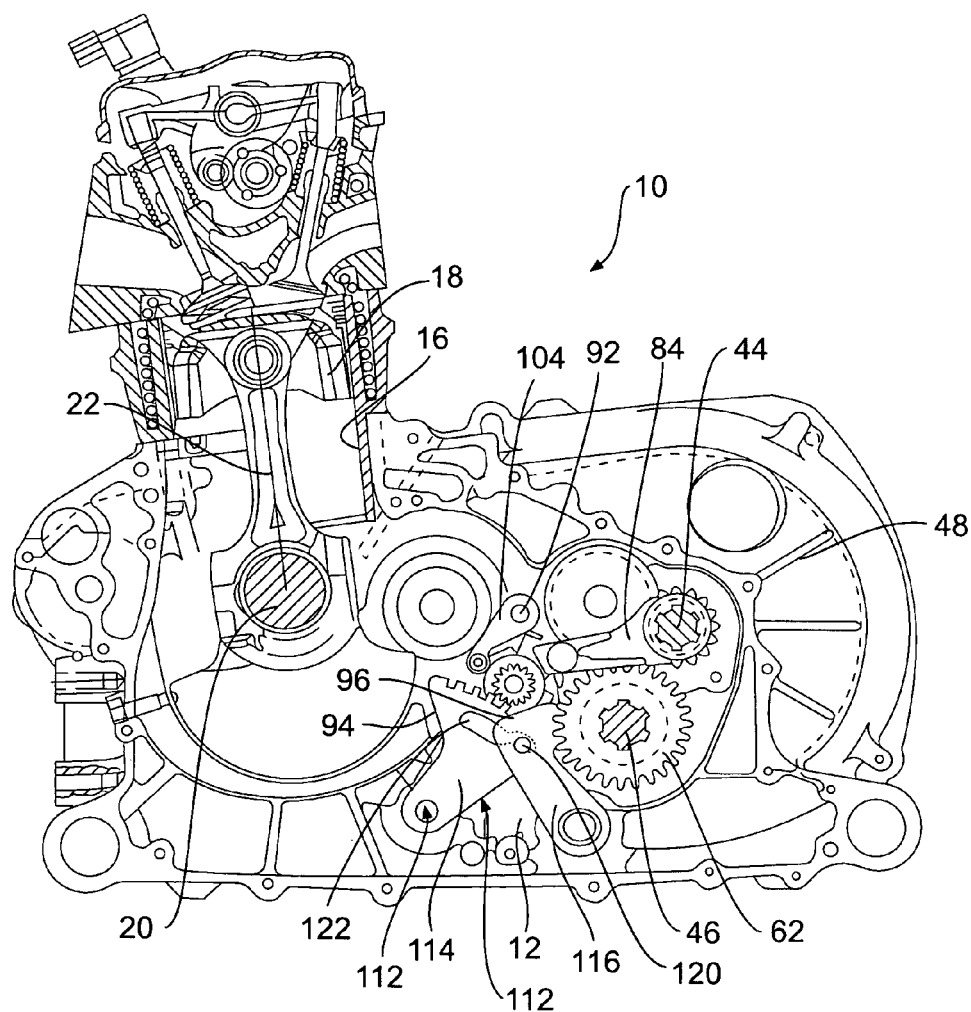
FIG. 3 is a cross-sectional, side view illustration of the engine of FIG. 1 equipped with a parking gear assembly of the present invention.

As shown in FIGS. 1 and 3, the engine 10 includes a cylinder 16, a piston 18 slidably mounted in the cylinder 16, a crankshaft 20, and a connecting rod 22 interconnecting the piston 18 and the crankshaft 20. In the illustrated embodiment, the crankshaft 20 is mounted transversely to the centerline 24 of the engine 10. The engine 10 may be provided within any suitable fuel delivery system without departing from the scope of the present invention (i.e., carburetor or fuel injection system).

The engine 10 is designed to be mounted preferably on a frame 26 of an ATV 28. One possible design for the ATV 28 is shown in dotted lines in FIG. 2. As illustrated, the engine 10 is positioned between the front wheels 30 and the rear wheels 32 of the ATV 28.

Figure 2:
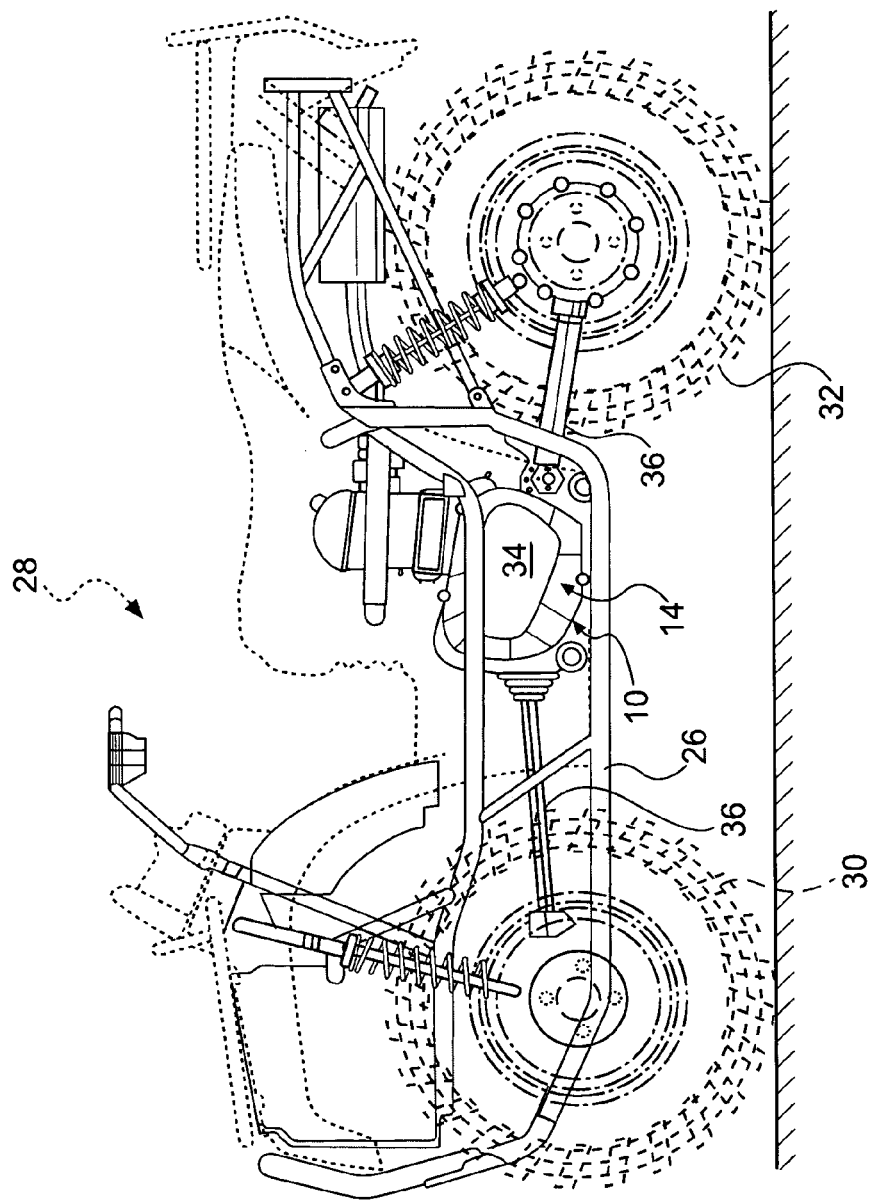
FIG. 2 is a side view of an ATV with the engine of FIG. 1 positioned thereon, the details of the ATV being shown in dotted line format.

As illustrated in FIGS. 1 and 2, the engine 10 is provided with the CVT 14, the moving components of which are enclosed within a cover 34. The CVT 14 operatively communicates with an output shaft 36 through a bevel gear 38 to provide power to the front wheels 30 and rear wheels 32 of the ATV 28. Motive power for the four-wheel drive is transmitted to the output shaft 36 via the bevel gear 38. While the ATV 28 illustrated is all-wheel drive, the ATV 28 may be a front wheel or rear wheel drive variety. The output shaft 36 is adapted to project from both sides of the engine 10 so that both 4-wheel and 2-wheel drive modes may be accommodated.

As shown in FIG. 1, the CVT 14 includes a drive pulley 40 and a driven pulley 42. The drive pulley 40 is fixedly connected to the crankshaft 20 such that torque is transmitted from the crankshaft 20 to the drive pulley 40. A continuous belt 43 operatively connects the drive pulley 40 to the driven pulley 42 to permit torque transfer from the drive pulley 40 to the driven pulley 42. The driven pulley 42 is fixedly connected to a driven shaft or countershaft 44. The driven shaft 44 is drivingly engaged with a secondary shaft 46 that is drivingly engaged with the output shaft 36. Thus, torque from the crankshaft 20 is transmitted from the drive pulley 40 to the driven pulley 42 via the belt 43, from the driven pulley 42 to the driven shaft 44, from the driven shaft 44 to the secondary shaft 46, from the secondary shaft 46 to the output shaft 36, and from the output shaft 36 to the front wheels 30 and rear wheels 32 of the. ATV28.

Figure 4:
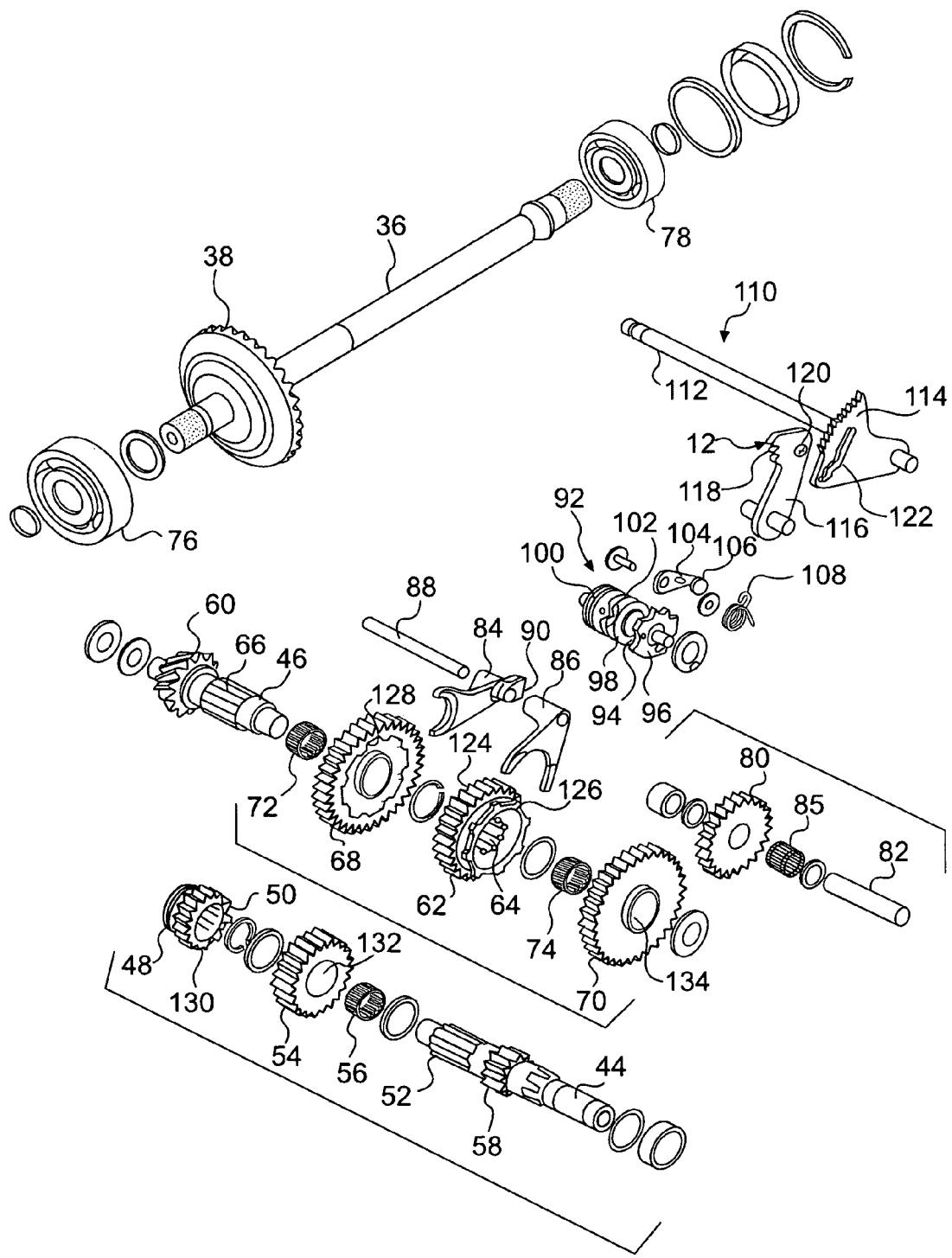
FIG. 4 as an exploded view illustrating the driven shaft assembly, secondary shaft assembly, output shaft assembly, and parking gear assembly of the engine.
Figure 6:
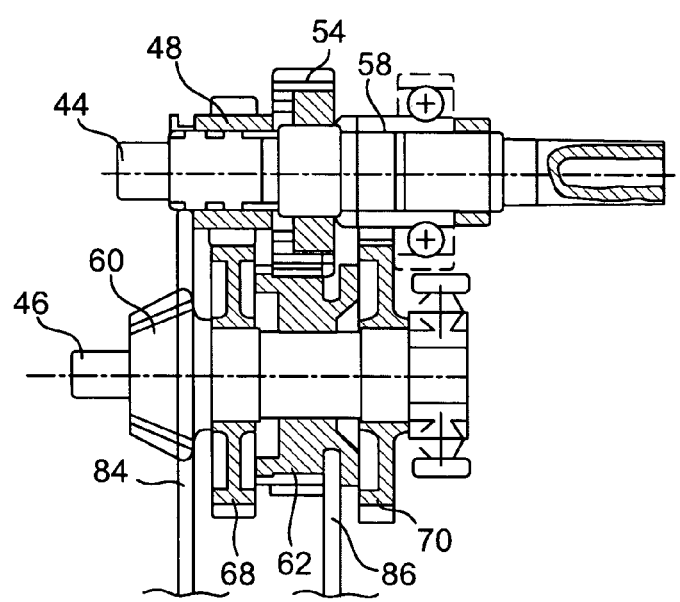
FIG. 6 is a cross-sectional view of the driven shaft assembly and the secondary shaft assembly of the transmission of the engine.

As shown in FIGS. 4 and 6, the driven shaft 44 and secondary shaft 46 each include a plurality of gears used for changing an operational speed of the ATV, i.e., accelerating/decelerating. Specifically, the driven shaft 44 includes a shift gear 48 operatively coupled thereto for common rotation about the driven shaft axis. The shift gear 48 is coupled to driven shaft 44 through axially aligned splines 50, 52 on the inner surface of the shift gear 48 and the outer surface of the driven shaft 44, respectively. The splines 50, 52 prevent relative rotational movement between the shift gear 48 and the driven shaft 44 while permitting relative axial movement therebetween. Thus, the shift gear 48 is selectively movable along the driven shaft 44 between a first position (shown in FIGS. 11, 12, and 14) and a second position (shown in FIG. 13). A pinion gear 54 is mounted on the driven shaft 44 adjacent the shift gear 48 using a bearing 56 such that the gear 54 can rotate relative to the driven shaft 44. The driven shaft 44 also includes a gear 58 that is machined directly thereon.

The secondary shaft 46 includes a shift gear 62 operatively coupled to the secondary shaft 46 for common rotation about the secondary shaft axis. The shift gear 62 is coupled to secondary shaft 46 through axially aligned splines 64, 66 on the inner surface of the shift gear 62 and the outer surface of the secondary shaft 46, respectively. The splines 64, 66 prevent relative rotational movement between the shift gear 62 and the secondary shaft 46 while permitting relative axial movement therebetween. Thus, the shift gear 62 is selectively movable along the secondary shaft 46 between a first position (shown in FIGS. 11 and 13), a second position (shown in FIG. 12), and a third position (shown in FIG. 14). Pinion gears 68, 70 are mounted on the secondary shaft 46 on opposing sides of the shift gear 62 using bearing 72, 74, respectively, such that the gears 68, 70 can rotate relative to the secondary shaft 46. The secondary shaft 46 also includes a bevel gear 60 that is drivingly interconnected with the gear 38 provided on the output shaft 36. The output shaft 36 is rotatably supported within the engine 10 by ball bearings 76, 78.

Figure 7:
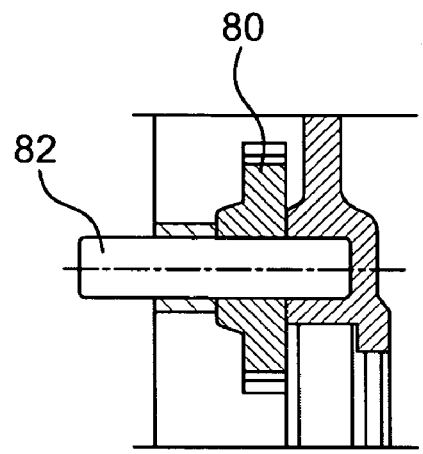
FIG. 7 is a cross-sectional view of a reverse gear of the transmission of the engine.

Further, as shown in FIGS. 4 and 7, a reverse gear 80 is provided on a shaft 82 that extends between the driven shaft 44 and the secondary shaft 46. The reverse gear 80 is mounted on the shaft 82 using a bearing 85 such that the reverse gear 80 can rotate relative to the shaft 82.

Figure 11:
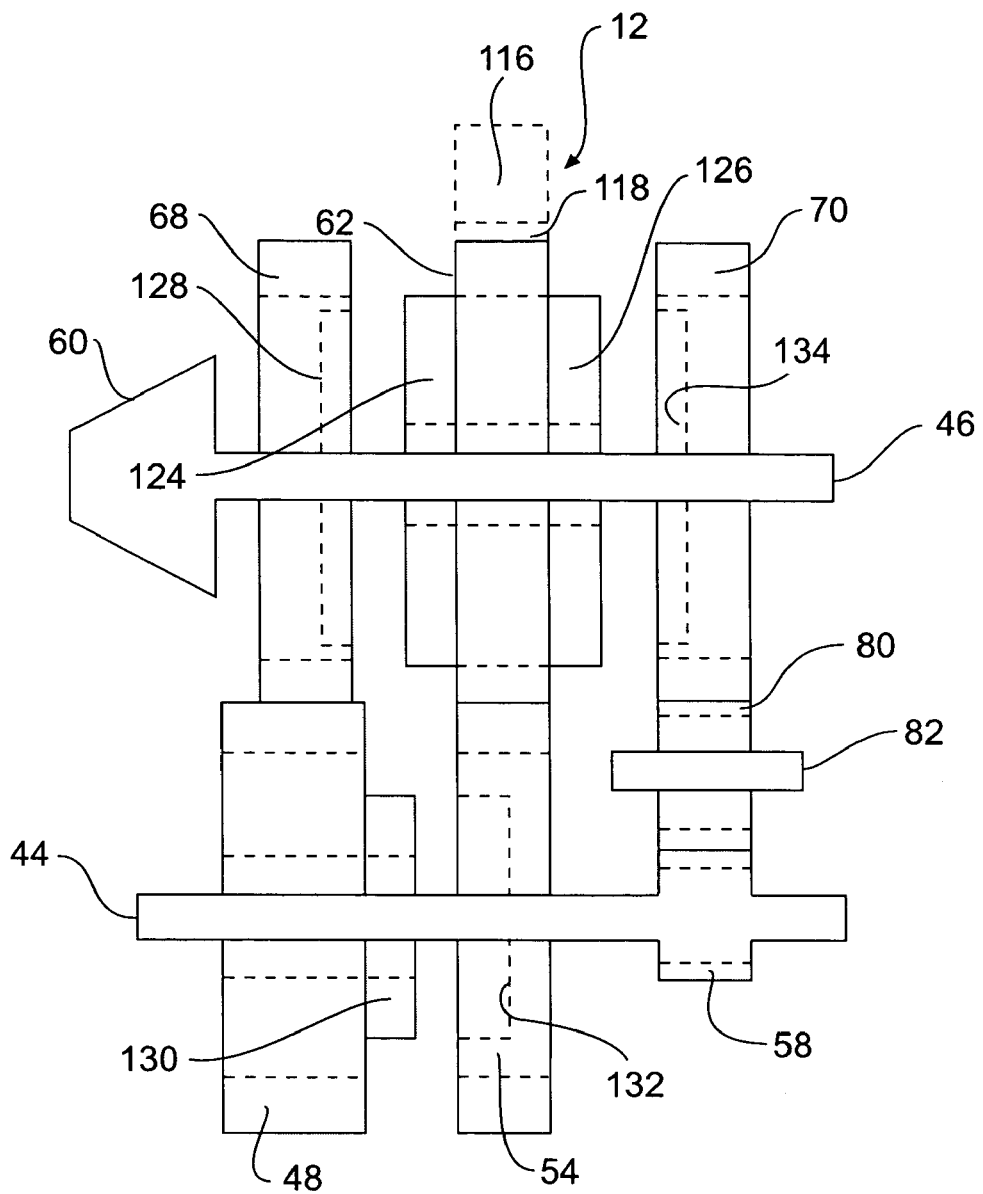
FIG. 11 is a schematic view illustrating gears of the transmission in a neutral or park position.

As best shown in FIG. 11 (showing a neutral position), the driven shaft 44, secondary shaft 46, and shaft 82 are positioned such that the shift gear 48 is engaged with the gear 68, the gear 54 is engaged with the shift gear 62, and the gear 58 is engaged with the gear 70 via the reverse gear 80.

Figure 5:
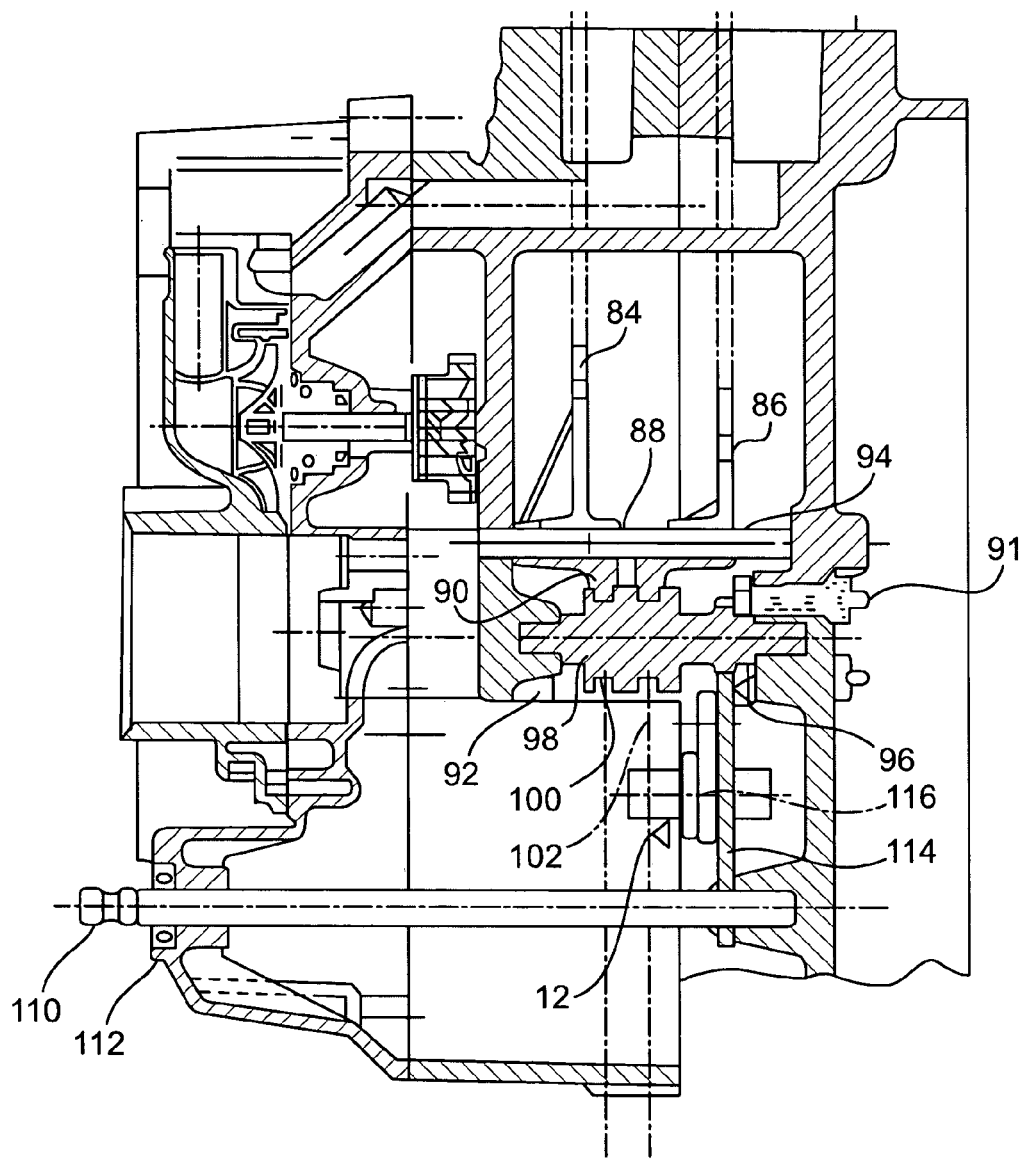
FIG. 5 is a cross-sectional view of a gear shift mechanism of the transmission of the engine.

As shown in FIGS. 4 and 5, the shift gears 48, 62 of the driven shaft 44 and secondary shaft 46 are controlled by shift forks 84, 86, respectively, to change the gear ratio of the transmission. Specifically, a shift shaft 88 supports the shift forks 84, 86. The shift fork 84 is operatively engaged with the shift gear 48 on the driven shaft 44 and the shift fork 86 is engaged with the shift gear 62 on the secondary shaft 46. Each shift fork 84, 86 includes a follower 90, 91 that is received within a corresponding groove provided in a gear shift mechanism 92.

As shown in FIGS. 4, 5, 9, and 10, the gear shift mechanism 92 provides a three step gearshift. The gear shift mechanism 92 includes a toothed wheel gear 94 having five possible positions: park, reverse, neutral, high, and low. Via a selector shaft 96, which is nonrotationally connected to the toothed gear 94, transmission of the gear positions to a control shaft 98 is affected.

Figure 8:
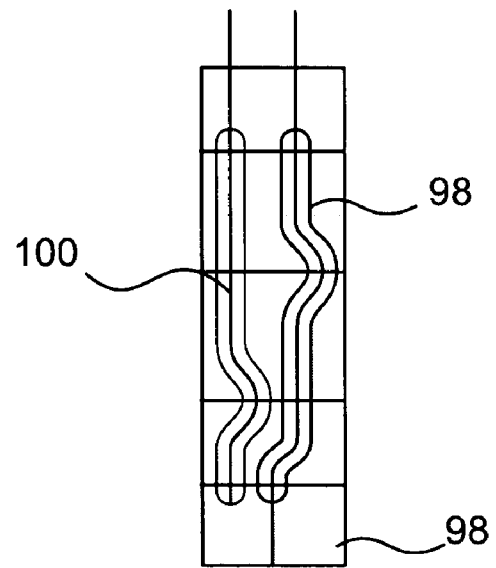
FIG. 8 is an enlarged view of a control shaft of the gear shift mechanism shown in FIG. 5.

As illustrated in FIG. 8, the surface of the control shaft 98 includes two grooves 100, 102. The grooves 100, 102 correspond to positions of the shift gears 48, 62, depending upon the position (i.e. rotation) of the control shaft 98, which are selected via shift forks 84, 86 to move into the correct position. More specifically, rotation of the toothed wheel gear 94 rotates the selector shaft 96 and the control shaft 98 nonrotationally connected thereto. As the control shaft 98 is rotated, the grooves 100, 102 rotate therewith, which causes reciprocating movement of the shift forks 84, 86. The reciprocating movement of the shift forks 84, 86 causes the shift gears 48, 62 to move axially along the driven shaft 44 and the secondary shaft 46, respectively.

As shown in FIGS. 3, 4, 9, and 10, an index lever 104 interacts with the selector shaft 96 to enable identification of the five possible positions. Specifically, the index lever 104 has a roller 106 that is biased into engagement with the selector shaft 96 by a spring 108. The selector shaft 96 has five recesses around the periphery thereof. The roller 106 of the index lever 104 engages within a selected one of the recesses, as the selector shaft 96 is rotated during rotation of the toothed wheel gear 94, to signify one of the five positions. In the illustrated embodiment, three of the recesses are positioned adjacent one another to facilitate shifting between these positions (i.e., reverse, neutral, and high). The remaining two recesses are spaced from the adjacent three recesses so that inadvertent shifting to these two positions (i.e., park and low) is avoided.

A shift shaft assembly 110 is engaged with the gear shift mechanism 92 to control the shifting of gears, as shown in FIGS. 4 and 5. Specifically, the shift shaft assembly 110 includes a shift shaft 112 with a sector gear 114 secured at one end thereof. The teeth of the sector gear 114 are engaged with the teeth of the toothed wheel gear 94 of the gear shift mechanism 92. Thus, rotation of the shift shaft 112 causes rotation of the sector gear 114 and hence rotation of the toothed wheel gear 94 between the five positions. The shift shaft 112 extends outwardly from the engine casing so that it can be operatively engaged with a handle which can be manually rotated by an ATV operator to shift gears.

Figure 9:
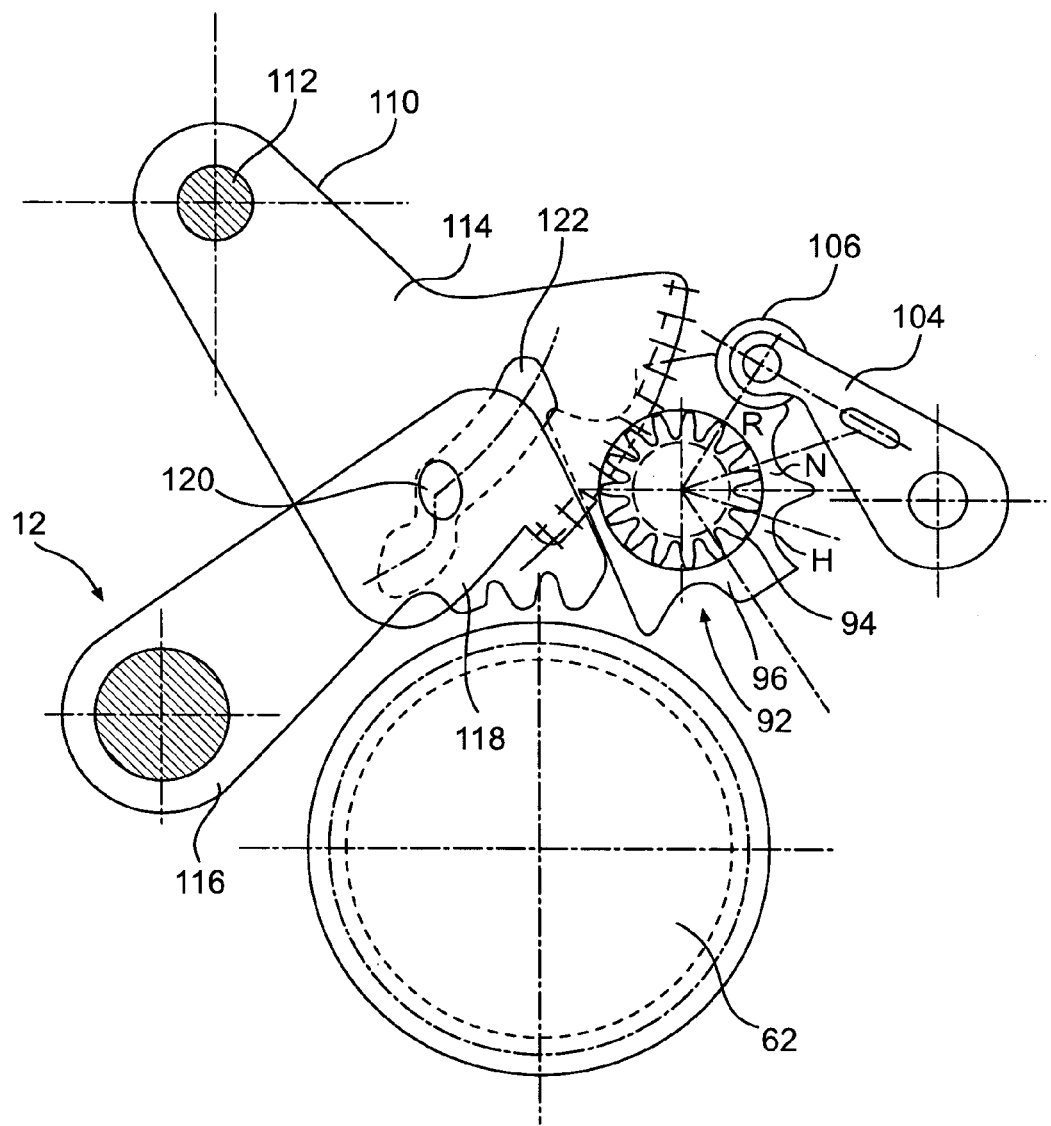
FIG. 9 is a cross-sectional view illustrating the parking gear assembly in a non-parked position (i.e., reverse position)
Figure 10:
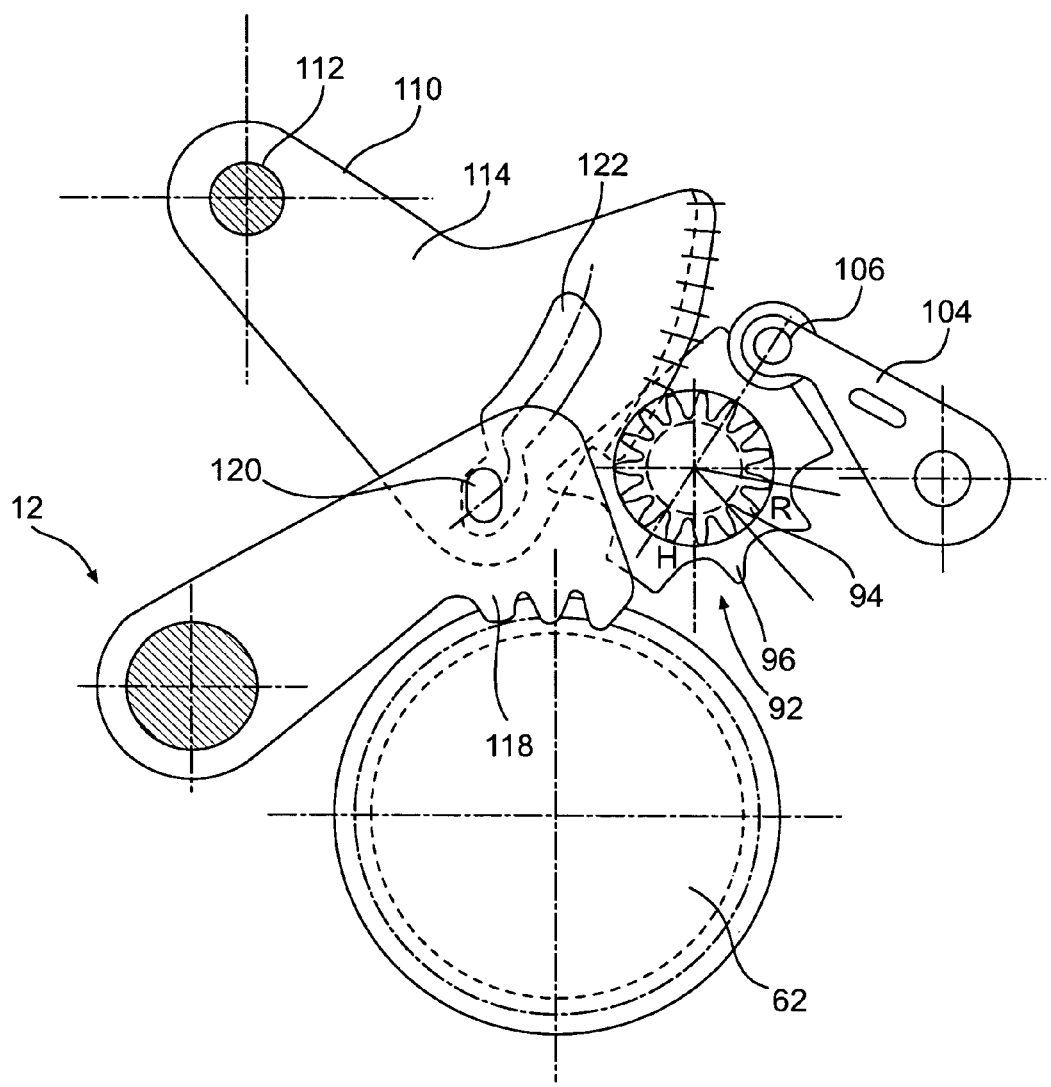
FIG. 10 is a cross-sectional view illustrating the parking gear assembly in a parked position.

As shown in FIGS. 4, 9, and 10, the parking gear assembly 12 includes a park rod 116 with a three-toothed segment 118 at a top portion thereof. The park rod 116 also includes a pin 120 that is operatively coupled to the shift shaft assembly 110. Specifically, the sector gear 114 of the shift shaft assembly 110 includes an elongated groove 122 that receives the pin 120 therein. As the shift shaft assembly 110 is rotated, the park rod 116, which is forcibly guided by the pin 120 engaged with the groove 122 on the sector gear 114, is rotated. When the ATV is in a park position (FIG. 10), the toothed segment 118 of the park rod 116 is rotated into engagement with the shift gear 62 to lock the secondary shaft 66 and prevent the movement of the output shaft 36, as will be further discussed.

The five possible positions, i.e., park, reverse, neutral, high, and low, will now be described in greater detail. In the neutral position as shown in FIG. 11, the shift forks 84, 86 are positioned such that the shift gear 48 on the driven shaft 44 is spaced from the gear 54. Further, the shift gear 62 on the secondary shaft 46 is spaced from both gears 68, 70. As a result, no torque from the driven shaft 44 is transferred to the secondary shaft 46 and hence to the output shaft 36. Specifically, the shift gear 48 engages the freewheeling gear 68 so it has no effect on the secondary shaft 46. Likewise, the gear 58 engages the freewheeling gear 70 via gear 80 so it has no effect on the secondary shaft 46. The gear 54, which is engaged with shift gear 62, freewheels on the driven shaft 44 so no torque is transferred to the shift gear 62 and hence the secondary shaft 46.

In the park position as shown in FIGS. 10 and 11 (the park rod 116 being shown in phantom in FIG. 11), the shift forks 84, 86 and hence all the gears are in the same position as in the neutral position. However, the toothed segment 118 of the park rod 116 is engaged with the shift gear 62 to lock the secondary shaft 46 and prevent the movement of the output shaft 36, which prevents any movement of the ATV. Specifically, the shift shaft assembly 110 selectively moves the park rod 116, via the pin 120, as the ATV is shifted into the park position. In the park position, the park rod 116 engages the shift gear 62 which is non-rotatably coupled to the secondary shaft 46 to thereby prevent the shift gear 62 and secondary shaft 46 from rotating. As a result, rotation of the bevel gear 60 is prevented, which prevents rotation of the output shaft 36 engaged therewith.

The park rod 116 is disengaged from the shift gear 62 when the ATV is not in a park position, as shown in FIG. 9. In the illustrated embodiment, the parking rod 116 is self-disengaging. Specifically, the teeth on the shift gear 62 and the three-toothed segment 118 of the park rod 116 are angled so that the park rod 116 may be easily disengaged from the shift gear 62. In other words, the teeth are angled such that the force required to disengage the park rod 116 from the shift gear 62 is sufficiently low to enable the ATV operator to manually disengage the teeth without requiring additional force.

It is contemplated that the park rod 116 may act on any gear downstream of the output shaft 36. For example, the park rod 116 may act on another one of the gears associated with the driven shaft 44 or secondary shaft 46 to prevent movement of the output shaft. Further, the park rod 116 may engage the crankshaft 20 or may engage one of the pulleys 40, 42.

Figure 12:
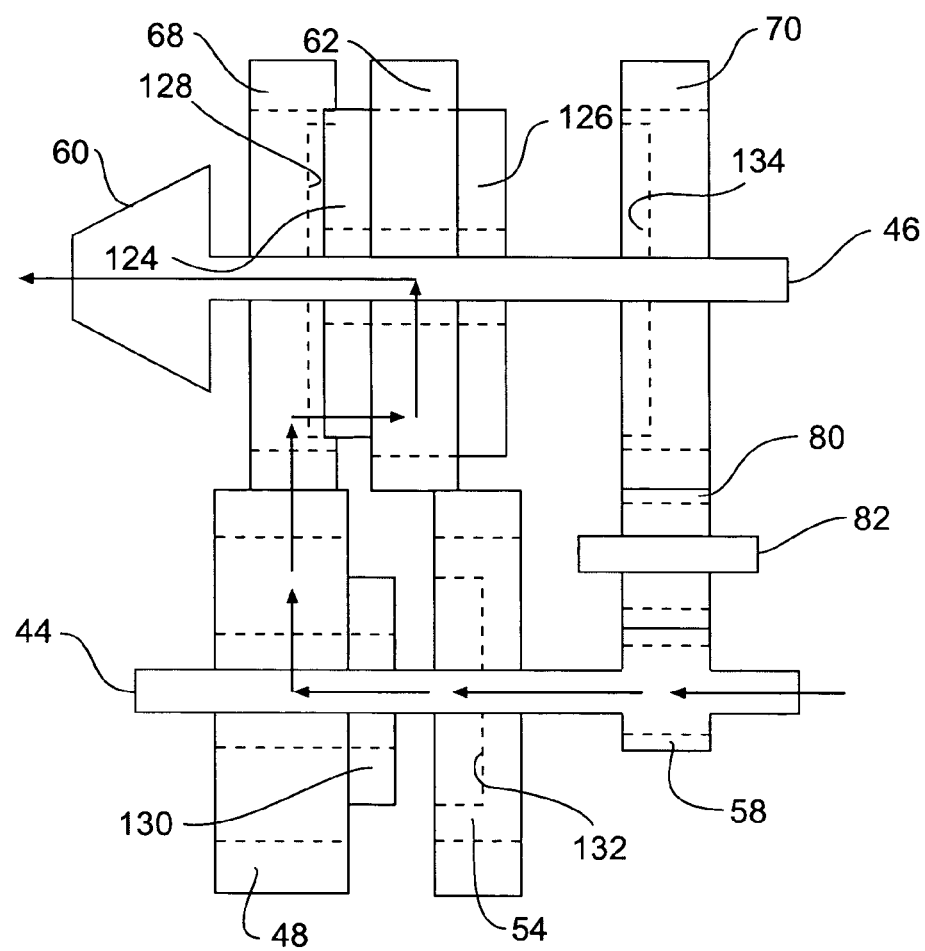
FIG. 12 is a schematic view illustrating gears of the transmission in a low position.

In the low position (for operation at lower speeds) as shown in FIG. 12, the shift fork 86 is shifted which shifts the shift gear 62 into non-rotational engagement with the gear 68. The shift gear 48 is shifted by shift fork 84 such that it is spaced from the gear 54. Specifically, the shift gear 62 has axially extending portions 124, 26 on opposing sides thereof. The axially extending portions 124, 126 each include a series of teeth on the periphery thereof. The gear 68 has a recess 128 on a side thereof that is configured to receive the series of teeth on the extending portion 124 of the shift gear 62. Thus, when the shift gear 62 is shifted into engagement with the gear 68, the teeth on the extending portion 124 engage in the recess 128 to non-rotationally couple the shift gear 62 and the gear 68. As a result, torque is transferred from the shift gear 48 on the driven shaft 44 to the gear 68 on the secondary shaft 46, from the gear 68 to the shift gear 62 engaged therewith, and from the shift gear 62 to the secondary shaft 46 nonrotatably engaged therewith. Hence, torque from the secondary shaft 46 is transferred to the bevel gear 60 which is engaged with the output shaft 36. The gear 58 engages the freewheeling gear 70 via gear 80 so it has no effect on the secondary shaft 46. Likewise, the gear 54, which is engaged with shift gear 62, freewheels on the driven shaft 44 so it has no effect on the secondary shaft 46.

Figure 13:
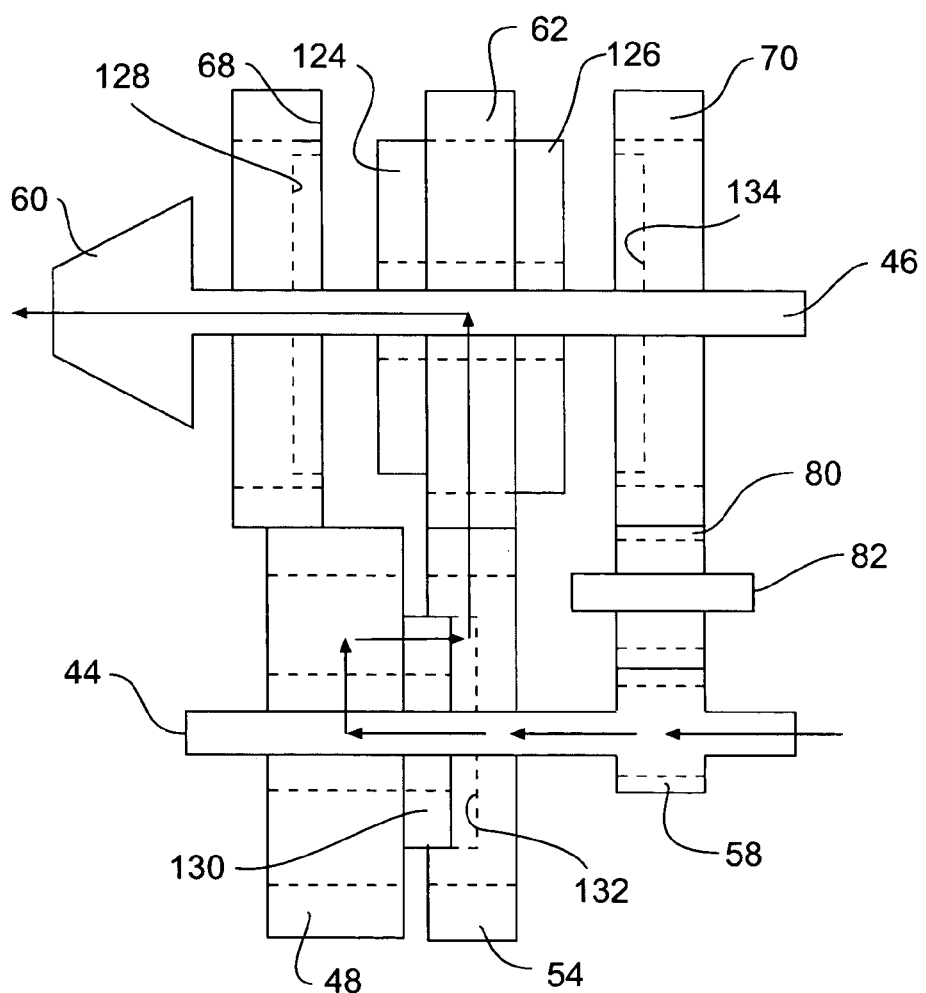
FIG. 13 is a schematic view illustrating gears of the transmission in a high position.

In the high position (for operation at higher speeds) as shown in FIG. 13, the shift fork 84 is shifted which shifts the shift gear 48 into non-rotational engagement with the gear 54. The shift gear 62 is shifted by shift gear 86 such that it is spaced from the gears 68, 70. Specifically, the shift gear 48 has an axially extending portion 130 on one side thereof. The axially extending portion 130 includes a series of teeth on the periphery thereof. The gear 54 has a recess 132 on a side thereof that is configured to receive the series of teeth on the extending portion 130 of the shift gear 48. Thus, when the shift gear 48 is shifted into engagement with the gear 54, the teeth on the extending portion 130 engage in the recess 132 to non-rotationally couple the shift gear 48 and the gear 54. As a result, torque is transferred from the shift gear 48 on the driven shaft 44 to the gear 54 engaged therewith, from the gear 54 to the shift gear 62 on the secondary shaft 46, and from the shift gear 62 to the secondary shaft 46 nonrotatably engaged therewith. Hence, torque from the secondary shaft 46 is transferred to the bevel gear 60 which is engaged with the output shaft 36. The gear 58 engages the freewheeling gear 70 via gear 80 so it has no effect on the secondary shaft 46. Likewise, the shift gear 48 engages the freewheeling gear 68 on the secondary shaft 46 so it has no effect on the secondary shaft 46.

Figure 14:
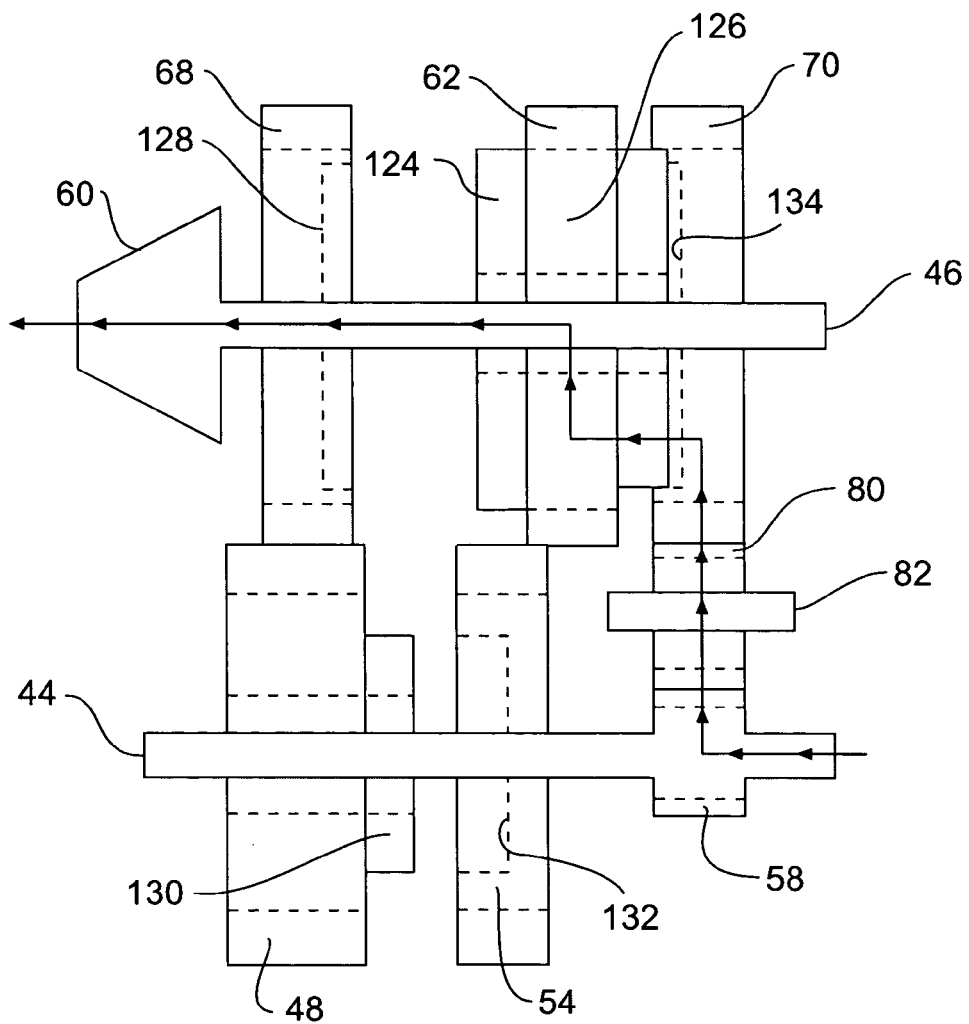
FIG. 14 is a schematic view illustrating gears of the transmission in a reverse position.

In the reverse position as shown in FIG. 14, the shift fork 86 is shifted which shifts the shift gear 62 into non-rotational engagement with the gear 70. The shift gear 48 is shifted by shift fork 84 such that it is spaced from the gear 54. Specifically, the gear 70 has a recess 134 on a side thereof that is configured to receive the series of teeth on the extending portion 126 of the shift gear 62. Thus, when the shift gear 62 is shifted into engagement with the gear 70, the teeth on the extending portion 126 engage in the recess 134 to non-rotationally couple the shift gear 62 and the gear 70. As a result, torque is transferred from the gear 58 on the driven shaft 44 to the gear 80 on the shaft 82, from the gear 80 to the gear 70 on the secondary shaft 46, from the gear 70 to the shift gear 62 engaged therewith, and from the shift gear 62 to the secondary shaft 46 nonrotatably engaged therewith. Hence, torque from the secondary shaft 46 is transferred to the bevel gear 60 which is engaged with the output shaft 36. The shift gear 48 engages the freewheeling gear 68 so it has no effect on the secondary shaft 46. Likewise, the gear 54, which is engaged with shift gear 62, freewheels on the driven shaft 44 so it has no effect on the secondary shaft 46. The reverse gear 80 is provided to rotate the gear 70 in an opposite direction with respect to the other gears on the secondary shaft 46. Thus, when in the reverse position, the secondary shaft 46 and the driven shaft 44 rotate in the same direction.

Further details of the CVT for an internal combustion engine are disclosed in application Ser. No. 09/944,159 entitled "Continuously Variable Transmission for an Internal Combustion Engine", the contents of which are incorporated herein by reference.

It can thus be appreciated that the aspects of the present invention have been fully and effectively accomplished. The foregoing specific embodiments have been provided to illustrate the structural and functional principles of the present invention, and they are not intended to be limiting. To the contrary, the present invention is intended to encompass all modifications, alterations and substitutions within the spirit and scope of the disclosed embodiments.

What is claimed is:

1. A straddle vehicle comprising:
    a frame supporting front and rear wheels;
    straddle seat supported on the frame
    an engine having an output shaft, the engine being supported by the frame below the seat;
    handle bars operatively connected to at least one of the wheel to steer the vehicle;
    a transmission coupled to the output shaft, the transmission including gears;
    a shift assembly operatively connected to the engine and displaceable over a predetermined distance upon application of a predetermined amount of force by a vehicle operator,
    the shift assembly comprising a park rod having a first end and a second end, the park rod pivoting about an axis proximate to the first end, the second end of the park rod selectively engaging one of the gears to prevent movement of the output shaft,
    the predetermined force being applied on the park rod between the axis and the second end.

2. The straddle vehicle according to claim 1, wherein the output shaft projects from both sides of the engine to transmit power to the front and rear wheels.

3. The straddle vehicle according to claim 1, wherein the transmission is a continuously-variable transmission including a driving pulley operatively connected to an engine crankshaft and a driven pulley.

4. The straddle vehicle according to claim 3, wherein the driven pulley is operatively connected to a driven shaft, the driven shaft drivingly engaged with a secondary shaft that is drivingly engaged with the output shaft.

5. The straddle vehicle according to claim 4, wherein the driven shaft and the secondary shaft each include a plurality of gears, the parking gear assembly engaging one of the plurality of gears of one of the drivenshaft and the secondary shaft to prevent movement of the output shaft.

6. The straddle vehicle according to claim 5, wherein the parking gear assembly engages one of the plurality of gears associated with the secondary shaft.

7. The straddle vehicle according to claim 1, wherein the park rod has a toothed segment, the toothed segment engaging one of the gears to prevent movement of the output shaft.

8. The straddle vehicle according to claim 1, wherein the shift assembly includes an elongated groove that receives a pin associated with the parking gear assembly, the shift assembly moving the parking gear assembly via the pin into selective engagement with one of the gears to prevent movement of the output shaft.

9. The straddle vehicle according to claim 1, wherein the shift assembly is movable to a park position, a reverse position, a neutral position, a high position, and a low position.

* * * * *